(12) United States Patent
O'Leary

(10) Patent No.: US 9,963,752 B2
(45) Date of Patent: May 8, 2018

(54) CONDUCTIVE LEATHER MATERIALS AND METHODS FOR MAKING THE SAME

(71) Applicant: Fownes Brothers & Co., Inc., New York, NY (US)

(72) Inventor: David O'Leary, Yeovil (GB)

(73) Assignee: Fownes Brothers & Co., Inc., New York, NY (US)

(*) Notice: Subject to any disclaimer, the term of this patent is extended or adjusted under 35 U.S.C. 154(b) by 679 days.

(21) Appl. No.: 13/958,126

(22) Filed: Aug. 2, 2013

(65) Prior Publication Data

US 2014/0099431 A1    Apr. 10, 2014

Related U.S. Application Data

(62) Division of application No. 13/568,869, filed on Aug. 7, 2012, now Pat. No. 8,507,102.

(51) Int. Cl.
| | |
|---|---|
| *C14C 11/00* | (2006.01) |
| *C14C 13/00* | (2006.01) |
| *C14C 13/02* | (2006.01) |
| *B32B 9/02* | (2006.01) |
| *C08L 75/04* | (2006.01) |

(52) U.S. Cl.
CPC ............. *C14C 13/00* (2013.01); *B32B 9/025* (2013.01); *C14C 11/003* (2013.01); *C14C 11/006* (2013.01); *C14C 13/02* (2013.01); *C08L 75/04* (2013.01); *Y10T 428/4935* (2015.04)

(58) Field of Classification Search
CPC .................................................. A41D 19/0006
See application file for complete search history.

(56) References Cited

U.S. PATENT DOCUMENTS

| | | | |
|---|---|---|---|
| 2,279,094 A | 4/1942 | Siers |
| 2,287,744 A | 6/1942 | Monahan |
| 2,305,542 A | 12/1942 | Mason |
| 2,756,165 A | 7/1956 | Lyon |
| 2,879,452 A | 3/1959 | Page |
| 3,007,083 A | 10/1961 | MacQuaid, Jr. et al. |
| 3,148,083 A | 9/1964 | Herrick |
| 3,541,389 A | 11/1970 | Van Name |
| 3,695,988 A | 10/1972 | Steigerwald |
| 3,817,820 A | 6/1974 | Smith, II |

(Continued)

FOREIGN PATENT DOCUMENTS

| | | |
|---|---|---|
| CN | 1346912 | 5/2002 |
| CN | 2568684 | 8/2003 |

(Continued)

OTHER PUBLICATIONS

Surface Active Agents, Manual of Symbols and Terminology for Physicochemical Quantities and Units, IUPAC, http://old.iupac.org/reports/2001/colloid_2001/manual_of_s_and_t/node36.html, 2002, p. 1.*

(Continued)

*Primary Examiner* — Francisco Tschen
(74) *Attorney, Agent, or Firm* — Robert W. Morris; Eckert Seamans Cherin & Mellott, LLC

(57) ABSTRACT

Conductive leather materials and methods for making the same are provided. The conductive leather materials may have a conductivity suitable to operate touch-sensitive electronic devices without a conductive path to the human body.

17 Claims, 2 Drawing Sheets

(56) References Cited

U.S. PATENT DOCUMENTS

| | | | |
|---|---|---|---|
| 3,901,929 A * | 8/1975 | Cote | C14C 3/08 |
| | | | 252/8.57 |
| 4,077,853 A | 3/1978 | Coll-Palagos | |
| 4,259,854 A * | 4/1981 | Knyazeva | C14C 13/00 |
| | | | 69/21 |
| 4,344,762 A * | 8/1982 | Monsheimer | C14C 1/04 |
| | | | 435/265 |
| 4,751,750 A * | 6/1988 | Tepley | A41D 19/00 |
| | | | 2/161.2 |
| 4,850,838 A | 7/1989 | Wagner et al. | |
| 5,153,067 A | 10/1992 | Yoshida et al. | |
| 5,503,754 A * | 4/1996 | Counts | C14C 1/06 |
| | | | 252/8.57 |
| 5,716,893 A | 2/1998 | Child | |
| 5,993,560 A | 11/1999 | Wasak et al. | |
| 6,001,749 A | 12/1999 | Child et al. | |
| 6,022,383 A * | 2/2000 | Kuwabara | B41J 2/2114 |
| | | | 347/105 |
| 6,277,439 B1 * | 8/2001 | Painter | C14C 9/00 |
| | | | 427/180 |
| 6,716,481 B2 | 4/2004 | DeAngelis et al. | |
| 7,662,461 B2 | 2/2010 | Xia et al. | |
| 7,824,737 B2 | 11/2010 | Xia et al. | |
| 7,872,069 B2 | 1/2011 | Xia et al. | |
| 8,062,540 B2 | 11/2011 | Sugimoto et al. | |
| 2002/0035755 A1 | 3/2002 | Widdemer | |
| 2002/0132905 A1 | 9/2002 | Babinee et al. | |
| 2003/0077394 A1 | 4/2003 | Bradford et al. | |
| 2003/0211320 A1 | 11/2003 | Thompson et al. | |
| 2003/0214161 A1 | 11/2003 | Seto et al. | |
| 2004/0063366 A1 | 4/2004 | Nakayama et al. | |
| 2004/0253404 A1 | 12/2004 | Wang et al. | |
| 2005/0008861 A1 | 1/2005 | Yadav et al. | |
| 2005/0271566 A1 | 12/2005 | Yadav | |
| 2005/0271881 A1 | 12/2005 | Hong | |
| 2006/0231320 A1 | 10/2006 | Kamizono et al. | |
| 2007/0154507 A1 | 7/2007 | Patton et al. | |
| 2007/0155855 A1 * | 7/2007 | Hees | C09B 67/0004 |
| | | | 523/160 |
| 2008/0068773 A1 | 3/2008 | Ober et al. | |
| 2008/0299406 A1 * | 12/2008 | Lee | C09D 175/04 |
| | | | 428/540 |
| 2008/0305300 A1 | 12/2008 | Suto et al. | |
| 2009/0075019 A1 | 3/2009 | Loos | |
| 2009/0205142 A1 * | 8/2009 | Vorlander | C14C 3/06 |
| | | | 8/94.2 |
| 2010/0281622 A1 * | 11/2010 | Sugimoto | C14C 3/20 |
| | | | 8/94.21 |
| 2011/0252580 A1 | 10/2011 | Miller et al. | |
| 2011/0283533 A1 | 11/2011 | Perelaer et al. | |
| 2012/0128995 A1 | 5/2012 | Leto | |
| 2012/0237783 A1 | 9/2012 | Leto | |

FOREIGN PATENT DOCUMENTS

| | | | |
|---|---|---|---|
| CN | 1978670 | 6/2007 | |
| CN | 1978671 | 6/2007 | |
| CN | 101240508 | 8/2008 | |
| DE | 2147904 | 3/1973 | |
| DE | 3447205 | 7/1986 | |
| DE | 3922300 | 1/1991 | |
| DE | EP 0392352 B1 * | 9/1994 | C08G 18/12 |
| DE | 202006007724 | 11/2006 | |
| EP | 0162645 | 11/1985 | |
| EP | 0511694 | 11/1992 | |
| GB | 557010 | 11/1943 | |
| GB | 674630 | 6/1952 | |
| GB | 749824 | 6/1956 | |
| GB | 853186 | 11/1960 | |
| GB | 1112711 | 5/1968 | |
| GB | 1327586 | 8/1973 | |
| GB | 1593510 | 7/1981 | |
| JP | 5-331500 | 12/1993 | |
| JP | 6-192969 | 7/1994 | |
| JP | 10-212737 | 8/1998 | |
| WO | 90/01249 | 8/1990 | |
| WO | 2005/100616 | 10/2005 | |
| WO | 2009/034037 | 3/2009 | |
| WO | 2009/150681 | 12/2009 | |
| WO | 2010/141743 | 12/2010 | |
| WO | WO 2010141743 A1 * | 12/2010 | C09D 175/04 |

OTHER PUBLICATIONS

Leather, Eckhardt Heidemann, Ullmann's Encyclopedia of Industrial Chemsitry Published Online Apr. 30, 2005, http://onlinelibrary.wiley.com/doi/10.1002/14356007.a15_259.pub2/abstract, Retrieved on Dec. 29, 2016. p. 1-44.*
Selvaraj et al. "Electrofinishing of Porous Non-Conductors Such as Leather." Plating and Surface Finishing, 63:8, pp. 30-35, Aug. 1976.
Pocket Book for the Leather Technologist, BASF Performance Chemicals, Jan. 22, 2007.
UV Process Supply, Inc. "Proper Dyne Testing: How, Why and When to Perform" 2005.

* cited by examiner

CONDUCTIVE LEATHER MATERIALS AND METHODS FOR MAKING THE SAME

CROSS-REFERENCE TO RELATED APPLICATIONS

This application is a divisional of U.S. patent application Ser. No. 13/568,869 filed Aug. 7, 2012 (co-pending), which is hereby incorporated by reference herein in its entirety.

BACKGROUND

Electrically conductive fabrics and textiles are well known in the art. Such materials have found a wide variety of uses, including in anti-static, anti-microbial, and functional cloth applications. Recently, with the proliferation of touch-sensitive electronic devices, interest in attractive fabrics with high electrical conductivity has increased considerably.

Child U.S. Pat. No. 5,716,893 discloses a method of depositing a conductive polymer film on a textile fabric substrate. The method includes synthesizing a pyrrole compound having improved stability by the oxidative polymerization of an aqueous solution of a pyrrole compound in the presence of an oxidizing agent, dopant anion and a stabilizing agent.

Child et al. U.S. Pat. No. 6,001,749 discloses a patterned conductive textile and a process for making the same. The process involves applying a durable finish to portions of the chosen substrate that inhibits the formation of a conductive polymer from forming on those areas.

DeAngelis et al. U.S. Pat. No. 6,716,481 discloses a process for making an electromagnetically conductive textile having a conductivity gradient through the thickness of the fabric. The process includes two or more superimposed webs of felt material with different electrical conductivities in order to create an conductivity gradient across the composite fabric's thickness.

Leto et al. International Publication No. WO 2010/141743 discloses a material for use with a capacitive touch screen. The materials include textiles, leathers, non-woven materials, and leather-like materials impregnated with a composition including an electrically conductive agent and a binder. The process includes curing coatings either under heat or air dried without heat.

Attempts at producing a conductive leather product, however, have resulted in products that do not approach the level of quality that consumers have come to expect. In particular, conductive leather is currently only available in limited colors, and the conductivity of the leather degrades unacceptably with time and use particularly due to conditions such as from wetness due to snow, ice, and laundering. Thus, what are needed are high-quality conductive leather materials and methods for making the same that overcome the shortcomings of the current state-of-the art.

SUMMARY

Conductive leather materials and methods for making the same are disclosed. The conductive leather materials disclosed herein may have a conductivity in the range necessary to operate touch-sensitive electronic devices without relying on a conductive path to the human body. These conductive leather materials may incorporate electrically conductive metallic or nonmetallic particles in sufficient quantities to achieve the necessary level of conductivity.

In some embodiments, the starting material may be leather that has been drum dyed, processed, and softened in preparation for receiving one or more surface coatings. This initial preparation may result in a leather material with a surface tension suitable to achieve a level of coating penetration that prevents coating removal and, therefore, color and conductivity from diminishing over time. Depending on the desired color and conductivity of the finished conductive leather material, a suitable number of coatings may be applied to the starting material. The conductive leather material may be subjected to a thorough dying process including exposure to both heat and air movement in between consecutive coating applications. Multiple identical or similar coatings may be applied in groups, or layers, and according to some embodiments, a conductive leather material may include several of these multi-coat layers. The conductive leather materials disclosed herein may be incorporated into an article of clothing such as a glove, hat, shoe, or jacket.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION

Capacitive touch-sensitive electronic device displays have revolutionized the way that we interact with electronic devices in applications ranging from mobile phones to ATMs. These user input devices can be integrated directly into a display screen, and they allow for powerful, intuitive, and direct control of what is actually displayed on the screen without the need for additional peripheral hardware such as a keyboard, mouse, or stylus. One disadvantage of capacitive touch-sensitive displays is that they require a charge-conducting input mechanism (e.g., the human body) to distort the screen's electrostatic field. Thus, capacitive touch-sensitive displays cannot be controlled by products that are electrically insulating, such as gloves, plastic styluses, etc.

Figure 1:
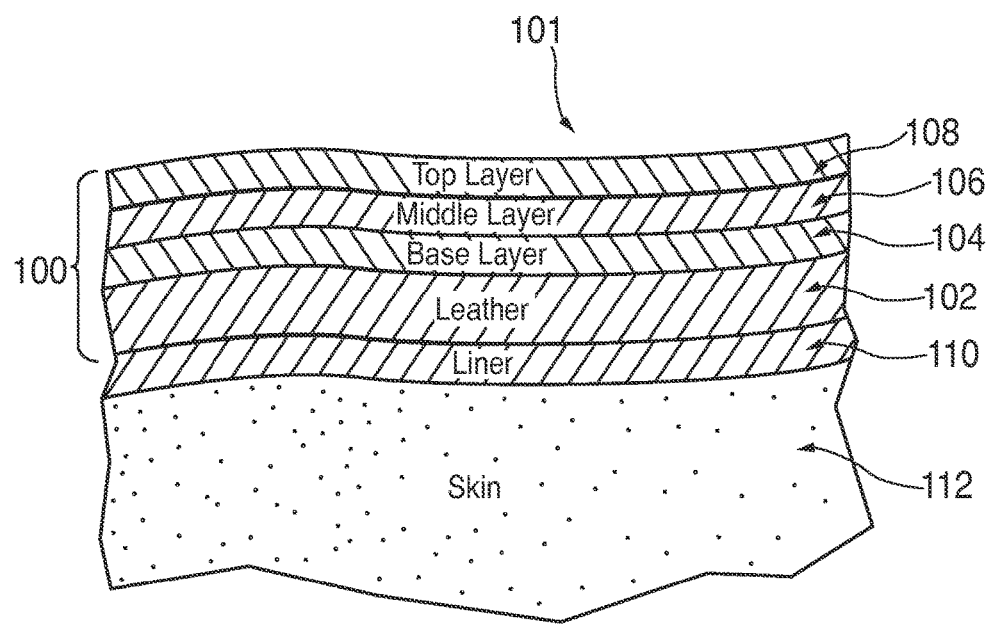
FIG. 1 illustrates a cross-sectional view of a conductive leather glove in accordance with some embodiments.

FIG. 1 is a cross-sectional view of a conductive leather glove 101 including conductive leather material 100 in accordance with some embodiments. Conductive leather material 100 can include leather 102, base layer 104, middle layer 106, top layer 108, and liner 110. In embodiments in which the conductive leather material is meant to be worn (e.g., conductive leather material forms part or all of a conductive leather glove 101), conductive leather material may be configured such that the wearer's skin 112 is next to a conductive or a nonconductive liner 110.

The starting material for conductive leather material 100, which may be capable of operating capacitive touch-sensitive displays according to some embodiments, may be leather 102 that has been drum dyed, processed, and softened in preparation for receiving one or more of coatings.

For example, the starting material may be a full-grain leather. The pre-processing may be designed to result in a leather material with a surface tension optimized for penetration of the coating and subsequent adhesion. The surface tension may be measured with any suitable method known in the art, including, for example, measuring the amount of time required for the surface of the starting material to wet. Wetting time for optimal surface tension may be, for example, less than 60 seconds.

Figure 2:
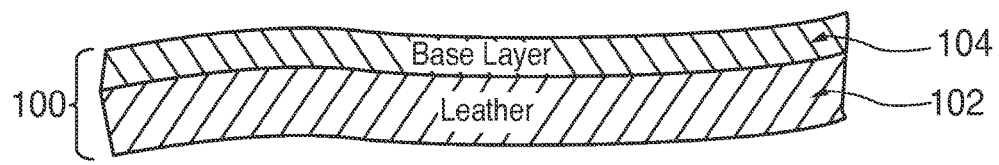
FIGS. 2-4 illustrate cross-sectional views of a conductive leather material in accordance with some embodiments.

FIG. 2 is a cross-sectional view of conductive leather material 100 including leather 102 and base layer 104 in accordance with some embodiments. In some embodiments, electrically conductive particles may be incorporated into a mixture or solution for one or more initial coatings. These one or more initial coatings may collectively form base layer 104. As used herein, a "layer" may refer to a series of identical or similar coatings that share the same basic properties and constituent materials.

Leather 102 may be then be treated with one or more coatings that include electrically conductive particles. The electrically conductive particles may be metallic (e.g., pure metal particles or alloys) or nonmetallic (e.g., polymers, carbon-based conductive particles, etc.).

The electrically conductive particles can be, according to some embodiments, particulates of an electrically conducting metal such as iron, cobalt, nickel, copper, palladium, silver, platinum, gold, any other suitably conductive metal or metallic alloy. Furthermore, the electrically conductive particles may include conductive or nonconductive particles coated with any of the above metals.

The electrically conductive particles can be, according to further embodiments, any suitable electrically conducting polymer such as poly(3,4-ethylenedioxythiophene), poly(fluorene)s, polyphenylenes, polypyrenes, polyazulenes, polynaphthalenes, poly(pyrrole)s, polycarbazoles, polyindoles, polyazepines, polyanilines, poly(thiophene)s, or poly(p-phenylene sulphide).

The electrically conductive particles can be, according to still further embodiments, any suitable electrically conducting carbon-based material such as graphite, carbon nanotubes, or carbon black.

The initial coating mixture may also include one or more dispersing agents (e.g., non-ionic, anionic, cationic and/or amphoteric surfactants), aqueous based acrylics and/or polyurethane resins, binders, fillers and waxes, water miscible solvents, and/or water.

Any suitable number of coatings may be applied to complete base layer 104. For example, depending on the desired conductivity of the conductive leather material, base layer 104 may include 2-4 coatings of the initial coating mixture. Each of the initial coatings may be identical, or, according to some embodiments, the initial coating mixture may be varied slightly from coating to coating in order to achieve optimal penetration and adhesion of each coating.

In general, each coating may be applied to the grain surface of the leather by means of spraying, roller coating, padding, curtain coating, or any other process currently known in the art or later developed. Depending on the application method, wet application levels for each coating of the base layer may be between 0.253-0.75 g/ft.

After each coating has been applied to the grain surface of the leather, conductive leather material 100 may be thoroughly dried using both heat and air movement. For example, in some embodiments the leather may be heated to a temperature of 60-80° C. in an oven (e.g., an industrial drying tool) with airflow provided by a fan or series of fans. In some further embodiments, the coated leather may be heated directly with a heat gun that provides both the heat and the airflow. Thorough drying of each layer prior to the application of subsequent coating(s) is critical in order to achieve optimal intercoat adhesion and durability of both the conductivity and integrity and/or performance of the coating. Following application of base layer 104, the sheet resistance of the conductive leather material may be less than $10^3$ Ω-sq.

Figure 3:
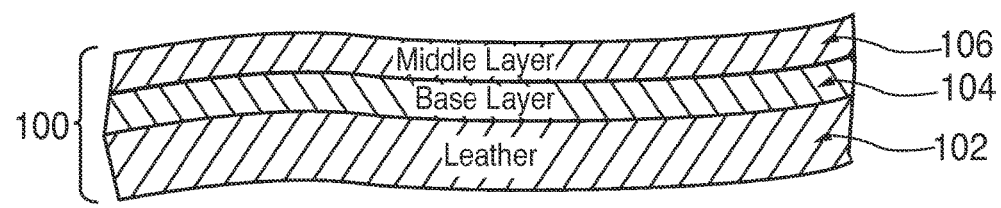

After all of the coatings of base layer 104 have been applied, a number of coatings of a middle-layer mixture may be applied to the grain surface of conductive leather material 100 to form middle layer 106. FIG. 3 illustrates a cross-sectional view of conductive leather material 100 including leather 102, base layer 104, and middle layer 106 in accordance with some embodiments. The middle-layer mixture may include aqueous pigment dispersions (e.g., polymeric and/or casein bound pigment dispersions) that impart a color to the conductive leather material. The number of coatings of the middle-layer mixture may vary depending on the opacity of the pigment. For example, coatings including lighter, less opaque pigments, such as yellow, may require a relatively high number (e.g., six) coatings of the middle-layer mixture to be applied to conductive leather material 100. In contrast, if the pigments are more opaque (e.g., for a darker color such as navy blue), fewer coatings (e.g., three) of the middle-layer mixture may be required.

The middle-layer mixture may also include aqueous based acrylic and/or polyurethane based binders, fillers and waxes, and water, as well as any number of the materials included in the coatings of base layer 104. As disclosed above, thorough drying of each coating with heat and air movement is critical for maintaining the integrity and performance of the coatings. Additionally, the middle-layer mixture may be applied according to any suitable method including spraying, roller coating, padding, and/or curtain coating.

Any suitable number of coatings may be applied to complete middle layer 106. For example, depending on the desired color of the conductive leather material, the middle layer may include 2-6 coatings of the middle layer coating mixture. Each of the middle layer coatings may be identical, or, according to some embodiments, the middle layer coating mixture may be varied slightly from coating to coating in order to achieve the required color, optimal penetration, surface aesthetics, physical performance, and adhesion of each coating. Depending on the application method, wet application levels for each coating of the middle layer may be between 0.412-0.75 g/ft.

Figure 4:
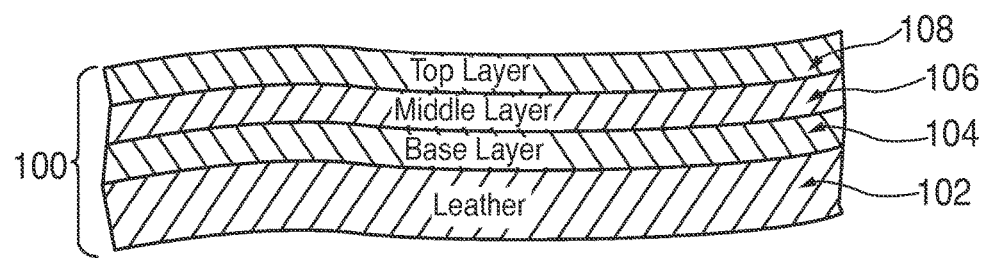

After middle layer 106 is complete, top layer 108 may be applied to the conductive leather material. FIG. 4 is a cross-sectional view of conductive leather material 100 including leather 102 and base layer 104, middle layer 106, and top layer 108 in accordance with some embodiments. Top layer 108 may include several top-layer coatings that include aqueous polyurethane based resins, water-dilutable nitrocellulose lacquer emulsions, fillers and waxes, and water. Additionally, the top-layer coatings may further include any of the materials included in the coatings of base layer 104 and middle layer 106.

Any suitable number of coatings may be applied to complete top layer 108. For example, top layer 108 may include 1-2 coatings of the top layer coating mixture. Each of the top layer coatings may be identical, or, according to some embodiments, the top layer coating mixture may be varied slightly from coating to coating in order to achieve optimal adhesion of each coating. Depending on the application method, we application levels for each coating of the top layer coating mixture may be between 0.22-0.5 g/ft.

After top layer 108 is applied, conductive leather material 100 may be subjected to a series of physical and mechanical operations including spraying water onto the back of the leather, ironing, milling (e.g., placing the conductive leather material into a drum and rotating the drum above 25 rpm), and mechanical softening (e.g., staking).

Although the general process has been described with respect no making leather materials, similar processing may be applied to other types of materials including woven and non-woven textiles and fabrics, including natural fabrics (e.g., cotton, wool, etc.), synthetic fabrics (nylon, rayon, etc.), non-woven materials (e.g., felt, synthetic leather, etc.). Moreover, although the disclosure above refers to specific base, middle, and top layers, more fluid distinctions may be appropriate in some embodiments. For example, concentrations of certain materials may be varied within the same layer, and one or more of the materials discussed with respect to a specific layer may also be included in one or more of the other layers. The layer appellations are meant to provide convenient points of reference for a general process flow that may be altered slightly without straying from the spirit of the embodiments disclosed herein.

Using the processes described above solves several issues that have thus far proven problematic for forming conductive leather materials for use in gloves with non-conductive linings. In particular, the above-described process results in conductive leather materials with appropriate color saturation, color fastness, and conductivity resilience. Ensuring that the surface tension of the starting material is in the optimal range and thoroughly drying the leather material between subsequent coatings serve to enhance those desirable properties.

In some embodiments, leather gloves with a conductive outer surface may be provided in a variety of colors. In such embodiments, it is important that the final color be desirable in terms of hue, saturation, brightness, and gloss. To accomplish this, some embodiments include the use of a blend of casein and polymeric bound pigments in the middle layer. Furthermore, as described above, the desired color may be achieved by varying the number of coatings in the middle layer, which includes the blend of casein and polymeric bound pigments, or the concentration of the blend of casein and polymeric bound pigments in each middle layer coating.

Furthermore, in it may be important for the final color to be maintained within an acceptable level of consistency throughout the useful life of the product. To accomplish this, some embodiments include the use of casein and/or polymeric bound pigments in the middle layer, which in combination with the appropriate binding resins, provide fastness to the color of the glove. In this manner, the quality and tint of the color remains substantially at or close to the original color regardless of the use in reasonable environmental conditions.

Figure 5:
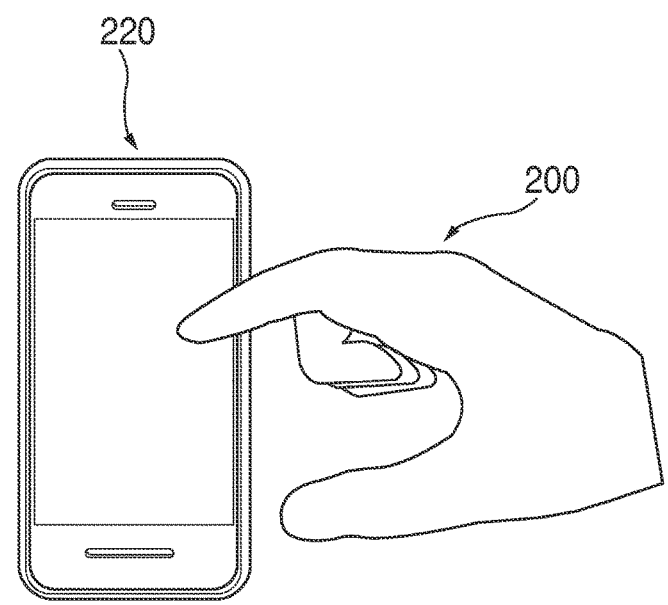
FIG. 5 is a perspective view of a conductive leather glove for interacting with a capacitive touch-sensitive electronic device in accordance with some embodiments.

FIG. 5 is perspective view of a conductive leather glove 200 interacting with a capacitive touch-sensitive electronic device 220 in accordance with some embodiments. Conductive leather glove 200 may be assembled using, for example, conductive leather material 100 described above. According to some embodiments, all of the leather used to assemble conductive leather glove 200 may be conductive leather. In other embodiments, however, typical non-conducting leather may be used for some parts of conductive leather glove 200. For example, because a user will, typically operate capacitive touch-sensitive electronic device 220 with his or her fingertips, typical non-conductive leather may be used for the portion of the glove corresponding to the back of the user's hand. In some other embodiments, conductive leather may be used only for the finger portions of conductive leather glove 200. The total amount of conductive leather used for conductive leather glove 200 may depend on the conductivity of the conductive leather used and the capacitive requirements of capacitive touch-sensitive electronic device 220.

EXAMPLE EMBODIMENTS

Example Embodiment 1: Dark Color Conductive Leather

Dark color conductive leather materials may be prepared with the following procedure. Skins may be softened initially by milling and submitted to further softening by staking. Next, the skins may be flattened via toggling and/or further staking. After the skins have been softened, the following mixtures may be applied to the skins as directed below. "Parts" as used herein are understood to be measured by weight.

Mixture 1 may be mechanically stirred until the conductive particulate is dispersed and suspended. Then, Mixture 2 may be added to Mixture 1 while stirring. The resultant mixture may be applied to the skins in any suitable manner (e.g., by spray coating). Three coatings of this mixture may be applied, with the treated skins being dried thoroughly after each coating via applied heat and air movement. The conductivity of the treated material may be checked after each coating. After the third coating, the sheet resistance may be $\leq 10^3$ $\Omega$/sq.

Mixture 1:

| Material | Parts |
| --- | --- |
| Conductive Particulate | 30 |
| Long-chain Alcohol ($C_{10}$) Non-Ionic Surfactant | 10 |
| Dipolar Aprotic Solvent | 120 |

Mixture 2:

| Material | Parts |
| --- | --- |
| Water | 450 |
| Fine Particle Size Polyacrylate Dispersion | 300 |
| Blend of Acrylic/Urethane Based Polymeric Dispersions | 200 |
| Wax Emulsion Based on Esters, Fatty Acids & Long-Chain Hydrocarbons | 50 |
| Blend of Casein/Polymeric Bound Pigments (Dark Masking Color) | 20-120 |

Next, three coatings of Mixture 3 may be applied to the treated skins, with the skins being dried thoroughly after each coating via applied heat and air movement.

Mixture 3:

| Material | Parts |
| --- | --- |
| Water | 450 |
| Fine Particle Size Polyacrylate Dispersion | 300 |
| Blend of Acrylic/Urethane Based Polymeric Dispersions | 200 |
| Wax Emulsion Based on Esters, Fatty Acids & Long-Chain Hydrocarbons | 50 |
| Blend of Casein/Polymeric Bound Pigments (Masking Color) | 20-120 |

Five coatings of mixture 4 may then be applied, with the skins being dried thoroughly after each coating via applied heat and air movement.

Mixture 4:

| Material | Parts |
| --- | --- |
| Water | 450 |
| Fine Particle Size Polyacrylate Dispersion | 300 |
| Blend of Acrylic/Urethane Based Polymeric Dispersions | 200 |
| Wax Emulsion Based on Esters, Fatty Acids & Long-Chain Hydrocarbons | 50 |
| Blend of Casein/Polymeric Bound Pigments (Required Color) | 20-120 |

Two coatings of Mixture 5 may then be applied, with the skins being dried thoroughly after each coating via applied heat and air movement.

Mixture 5:

| Material | Parts |
| --- | --- |
| Water | 450 |
| Wax Emulsion Based on Esters, Fatty Acids, Long-Chain Hydrocarbons, and Silicon | 40 |
| Water Dilutable Nitrocellulose Lacquer Emulsion | 500 |
| Emulsion of a High Molecular Mass Polysiloxane | 10 |

One coating of Mixture 6 may then be applied, with the skins being dried thoroughly after each coating via applied heat and air movement.

Mixture 6:

| Material | Parts |
| --- | --- |
| Water | 800 |
| Wax Emulsion Based on Esters, Fatty Acids, Long-Chain Hydrocarbons, and Amine Derivatives | 150 |
| Wax Emulsion Based on Fatty Acids and Long-Chain Hydrocarbons Lacking Functional Groups | 50 |

The treated material may then be conditioned to achieve 14%-22% moisture. Next, the treated material can be softened further by milling and/or staking. Finally, the treated material can be ironed (e.g., at or near 150° C.).

Example Embodiment 2: Mid-Tone Color Conductive Leather

Mid-tone color conductive leather materials may be prepared with the following procedure. Skins may be softened initially by milling and submitted to further softening by staking. Next, the skins may be flattened via togging and/or further staking. After the skins have been softened, the following mixtures may be applied to the skins as directed below.

Mixture 1 may be mechanically stirred until the conductive particulate is dispersed and suspended. Then, Mixture 2 may be added to Mixture 1 while stirring. The resultant mixture may be applied to the skins in any suitable manner (e.g., by spray coating). Three coatings of this mixture may be applied, with the treated skins being dried thoroughly after each coating via applied heat and air movement. The conductivity of the treated material may be checked after each coating. After the third coating, the sheet resistance may be $\leq 10^3$ Ω/sq.

Mixture 1:

| Material | Parts |
| --- | --- |
| Conductive Particulate | 30 |
| Long-chain Alcohol ($C_{10}$) Non-Ionic Surfactant | 10 |
| Dipolar Aprotic Solvent | 120 |

Mixture 2:

| Material | Parts |
| --- | --- |
| Water | 450 |
| Fine Particle Size Polyacrylate Dispersion | 300 |
| Blend of Acrylic/Urethane Based Polymeric Dispersions | 200 |
| Wax Emulsion Based on Esters, Fatty Acids & Long-Chain Hydrocarbons | 50 |
| Blend of Casein/Polymeric Bound Pigments (Masking Color) | 20-120 |

Next, three coatings of Mixture 3 may be applied to the treated skins, with the skins being dried thoroughly after each coating via applied heat and air movement.

Mixture 3:

| Material | Parts |
| --- | --- |
| Water | 450 |
| Fine Particle Size Polyacrylate Dispersion | 300 |
| Blend of Acrylic/Urethane Based Polymeric Dispersions | 200 |
| Wax Emulsion Based on Esters, Fatty Acids & Long-Chain Hydrocarbons | 50 |
| Blend of Casein/Polymeric Bound Pigments (Light Masking Color) | 20-120 |

The range in masking color quantities may depend on the desired mid-tone color. Lighter colors (e.g., yellow and light blue) may require more masking pigments in each coating and/or more coatings with masking pigments.

Five coatings of mixture 4 may then be applied, with the skins being dried thoroughly after each coating via applied heat and air movement.

Mixture 4:

| Material | Parts |
| --- | --- |
| Water | 450 |
| Fine Particle Size Polyacrylate Dispersion | 300 |
| Blend of Acrylic/Urethane Based Polymeric Dispersions | 200 |
| Wax Emulsion Based on Esters, Fatty Acids & Long-Chain Hydrocarbons | 50 |
| Blend of Casein/Polymeric Bound Pigments (Required Color) | 20-120 |

Two coatings of Mixture 5 may then be applied, with the skins being dried thoroughly after each coating via applied heat and air movement.

Mixture 5:

| Material | Parts |
| --- | --- |
| Water | 450 |
| Wax Emulsion Based on Esters, Fatty Acids, Long-Chain Hydrocarbons, and Silicon | 40 |

-continued

| Material | Parts |
| --- | --- |
| Water Dilutable Nitrocellulose Lacquer Emulsion | 500 |
| Emulsion of a High Molecular Mass Polysiloxane | 10 |

One coating of Mixture 6 may then be applied, with the skins being dried thoroughly after each coating via applied heat and air movement.

Mixture 6:

| Material | Parts |
| --- | --- |
| Water | 800 |
| Wax Emulsion Based on Esters, Fatty Acids, Long-Chain Hydrocarbons, and Amine Derivatives | 150 |
| Wax Emulsion Based on Fatty Acids and Long-Chain Hydrocarbons Lacking Functional Groups | 50 |

The treated material may then be conditioned to achieve 14%-22% moisture. Next, the treated material may be softened further by milling and/or staking. Finally, the treated material can be ironed (e.g., at or near 150° C.).

Example Embodiment 3: Black Conductive Leather

Black conductive leather materials may be prepared with the following procedure. Skins may be softened initially by milling and submitted to further softening by staking. Next, the skins may be flattened via toggling and/or further staking. After the skins have been softened, the following mixtures may be applied to the skins as directed below.

Mixture 1 may be mechanically stirred until the conductive particulate is dispersed and suspended. Then, Mixture 2 may be added to Mixture 1 while stirring. The resultant mixture may be applied to the skins in any suitable manner (e.g., by spray coating). Three coatings of this mixture may be applied, with the treated skins being dried thoroughly after each coating via applied heat and air movement. The conductivity of the treated material may be checked after each coating. After the third coating, the sheet resistance may be $\leq 10^3$ $\Omega$/sq.

Mixture 1:

| Material | Parts |
| --- | --- |
| Conductive Particulate | 30 |
| Long-chain Alcohol ($C_{10}$) Non-Ionic Surfactant | 10 |
| Dipolar Aprotic Solvent | 120 |

Mixture 2:

| Material | Parts |
| --- | --- |
| Water | 450 |
| Fine Particle Size Polyacrylate Dispersion | 300 |
| Blend of Acrylic/Urethane Based Polymeric Dispersions | 200 |
| Wax Emulsion Based on Esters, Fatty Acids & Long-Chain Hydrocarbons | 50 |
| Blend of Casein/Polymeric Bound Pigments (Masking Color) | 100 |

Next, 3-5 coatings of Mixture 3 may then be applied to the treated skins, with the skins being dried thoroughly after each coating via applied heat and air movement.

Mixture 3:

| Material | Parts |
| --- | --- |
| Water | 450 |
| Fine Particle Size Polyacrylate Dispersion | 300 |
| Blend of Acrylic/Urethane Based Polymeric Dispersions | 200 |
| Wax Emulsion Based on Esters, Fatty Acids & Long-Chain Hydrocarbons | 50 |
| Blend of Casein/Polymeric Bound Pigments (Required Color) | 20-120 |
| Metal Complex Black Dyestuff, Water, and Organic solvent | 35 |

Two coatings of mixture 4 may then be applied, with the skins being dried thoroughly after each coating via applied heat and air movement.

Mixture 4:

| Material | Parts |
| --- | --- |
| Water | 450 |
| Wax Emulsion Based on Esters, Fatty Acids, Long-Chain Hydrocarbons, and Silicon | 40 |
| Water Dilutable Nitrocellulose Lacquer Emulsion | 500 |
| Emulsion of a High Molecular Mass Polysiloxane | 10 |

One coating of Mixture 5 may then be applied, with the skins being dried thoroughly after each coating via applied heat and air movement.

Mixture 5:

| Material | Parts |
| --- | --- |
| Water | 800 |
| Wax Emulsion Based on Esters, Fatty Acids, Long-Chain Hydrocarbons, and Amine Derivatives | 150 |
| Wax Emulsion Based on Fatty Acids and Long-Chain Hydrocarbons Lacking Functional Groups | 50 |

The treated material may then be conditioned to achieve 14%-22% moisture. Next, the treated material may be softened further by milling and/or staking. Finally, the treated material can be ironed (e.g., at or near 150° C.)

While there have been described conductive leather materials and methods for making the same, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The described embodiments of the invention are presented for the purpose of illustration and not of limitation.

What is claimed is:

1. A method for making conductive leather materials, the method comprising:

applying a base layer comprising at least one base layer coating, wherein the at least one base layer coating comprises electrically conductive particles, to a drum dyed, processed leather material that has been softened to reduce the surface tension between the leather material and the base layer coating such that the leather material is conditioned to achieve a level of coating penetration of the base layer coating into the leather material such that the leather material is conditioned to achieve 14 to 22 percent moisture and has a wetting time of less than 60 seconds;

applying a middle layer to the base layer, the middle layer comprising at least one middle layer coating, wherein the at least one middle layer coating comprises aqueous pigment dispersions; and applying a top layer to the middle layer, the top layer comprising at least one top layer coating, wherein the at least one top layer coating comprises:
aqueous polyurethane based resins; and
water-dilutable nitrocellulose lacquer emulsions; and
wherein the leather material is thoroughly dried by exposure to heat and moving air after application of each base layer coating, middle layer coating, and top layer coating.

2. The method of claim 1, further comprising assessing a surface tension of the leather material to determine susceptibility for optimum coating penetration and adhesion.

3. The method of claim 2, wherein assessing the surface tension of the leather material comprises:
measuring a wetting time required for a surface of the leather material to wet; and
determining that the wetting time is less than 60 seconds.

4. The method of claim 1, wherein:
the at least one base layer coating comprises a first base layer mixture and a second base layer mixture;
the first base layer mixture comprises the electrically conductive particles, and
the second base layer mixture comprises masking pigments.

5. The method of claim 4, wherein the first base layer mixture is mechanically stirred until the electrically conductive particles are dispersed and suspended, and the second base layer mixture is added to the first base layer mixture while stirring.

6. The method of claim 1, wherein the at least one base layer coating, the at least one middle layer coating, and the at least one top layer coating are applied by at least one of:
spray coating;
roller coating;
padding; and
curtain coating.

7. The method of claim 1, wherein:
the base layer comprises 2 to 4 base layer coatings;
the middle layer comprises 2 to 6 middle layer coatings; and
the top layer comprises 1 to 2 top layer coatings.

8. The method of claim 1, wherein the leather material comprises a top-grain leather.

9. The method of claim 1, wherein the electrically conductive particles comprise at least one of poly(3,4-ethylenedioxythiophene) and polyphenylene.

10. A method for making electrically conductive materials, the method comprising:
softening a leather material to reduce the surface tension between the leather material and a predetermined base layer coating such that the leather material has a wetting time of less than 60 seconds and is conditioned to achieve 14 percent to 22 percent moisture;

applying the base layer to the leather material, the base layer comprising the base layer coating, wherein the base layer coating comprises the electrically conductive particles;

applying a middle layer to the base layer, the middle layer comprising at least one middle layer coating, wherein the at least one middle layer coating comprises aqueous pigment dispersions; and applying a top layer to the middle layer, the top layer comprising at least one top layer coating, wherein the at least one top layer coating comprises:
aqueous polyurethane based resins; and
water-dilutable nitrocellulose lacquer emulsions; and
wherein the leather material is thoroughly dried by exposure to heat and moving air after application of each base layer coating, middle layer coating, and top layer coating.

11. The method of claim 10, wherein softening the leather material comprises:
milling the leather material;
staking the leather material after milling the leather material; and
toggling the leather material after staking the leather material.

12. The method of claim 11, further comprising assessing a surface tension of the leather material to determine susceptibility for optimum coating penetration and adhesion.

13. The method of claim 12, wherein assessing the surface tension of the leather material comprises:
measuring a wetting time required for a surface of the leather material to wet; and
determining that the wetting time is less than 60 seconds.

14. The method of claim 10, wherein:
the at least one base layer coating comprises a first base layer mixture and a second base layer mixture; wherein
the first base layer mixture comprises the electrically conductive particles, and
the second base layer mixture comprises masking pigments.

15. The method of claim 14, wherein the first base layer mixture is mechanically stirred until the electrically conductive particles are dispersed and suspended, and the second base layer mixture is added to the first base layer mixture while stirring.

16. The method of claim 10, wherein the at least one base layer coating, the at least one middle layer coating, and the at least one top layer coating are applied by at least one of:
spray coating;
roller coating;
padding; and
curtain coating.

17. The method of claim 10, wherein the electrically conductive particles comprises at least one of poly(3,4-ethylenedioxythiophene) and polyphenylene.

* * * * *